Dec. 23, 1952 W. A. RAY 2,622,622
FLUID CONTROL VALVE
Filed Oct. 10, 1947
Fig. 1
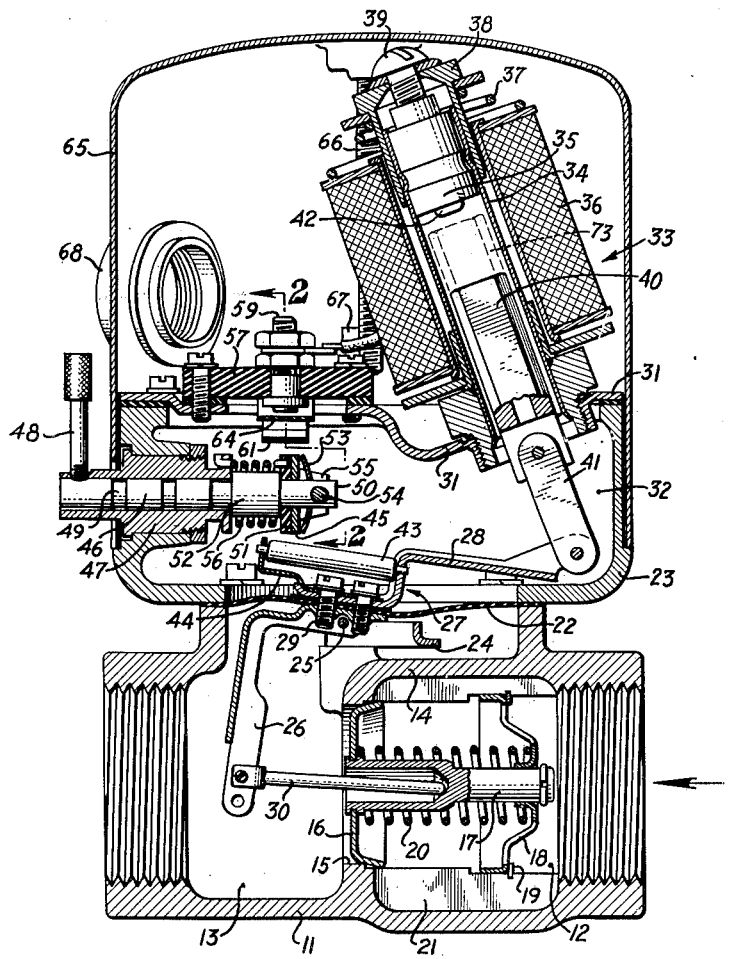
Fig. 2
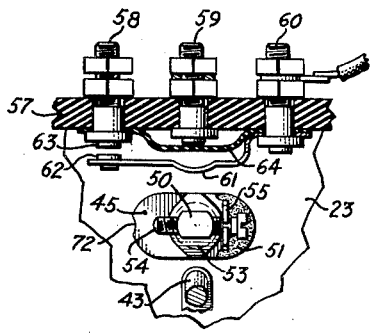
Fig. 3
Inventor
WILLIAM A. RAY,
By
John H. Rouse,
Attorney Patented Dec. 23, 1952

2,622,622

UNITED STATES PATENT OFFICE 2,622,622

FLUID CONTROL VALVE

William A. Ray, North Hollywood, Calif., assignor to General Controls Co., Glendale, Calif., a corporation of California Application October 10, 1947, Serial No. 778,996

2 Claims. (Cl. 137—720)

This invention relates to fluid control valves; the present application being directed to features of the invention disclosed in my copending application Serial No. 544,511, now abandoned, filed July 12, 1944, which copending application is a division of application Serial No. 407,932, filed August 22, 1941, now Patent No. 2,358,999, issued September 26, 1944. The present application discloses improvements over the device of the prior applications and is therefore a continuation-in-part thereof.

An object of this invention is to provide, in an automatic electrically-operated valve, novel means for operating the valve manually in the event of failure of electrical-energy supply and for maintaining the valve in operated condition, which means is rendered inoperative upon restoration of the supply to permit resumption of automatic operation.

For full understanding of the invention, and further appreciation of its features and advantages, reference is to be had to the following detailed description and accompanying drawing, and to the appended claims.

In the drawing:

Figure 1 is a sectional view of a valve structure embodying the invention;

Figure 2 is a fragmentary section taken generally along the line 2—2 of Fig. 1; and Figure 3 is a diagram of an electrical circuit for controlling the operation of the valve.

In the drawing, the numeral 11 indicates a valve casing having an inlet 12 and an outlet 13 separated by a partition 14; the partition having in its vertical portion a port 15 at whose inlet end is a seat for a cupped closure 16. The stem 17 of the closure is guided in a central opening in a spider 18 which fits in the outer end of the inlet passage and is restrained from outward movement by a snap-ring 19. The closure 16 is biased to seated position by a spring 20 compressed between it and the spider 18, and is guided in its movements by a plurality of spaced vanes 21 projecting from the casing.

Closing an opening through the top of the casing is a diaphragm 22, of flexible material such as leather or synthetic rubber, which is clamped at its margin to the casing by a cup-shaped member 23 secured to the casing and having in its bottom an opening conforming to the adjacent casing-opening. Extending integrally from the upper side-portion of the valve casing is a bracket 24 upon which is mounted, by means of a pivot-pin 25, a right-angled arm 26 which forms inside the casing a portion of a lever generally indicated at 27 and which includes, at the side of the diaphragm outside the casing, another portion 28 which is secured to the arm 26 by screws 29 passing through the diaphragm and forming a fluid-tight connection. Pivotally mounted on the lower end of arm 26 is a rod 30, projecting loosely within a cavity in the closure-stem 17, whereby rocking of the lever 27 in counterclockwise direction effects opening movement of the closure 16.

The cup-shaped member 23 is closed at its top by a plate 31 so that the interior of this member forms a sealed chamber defined at its bottom by the diaphragm 22; leakage, to the exterior of the valve structure, of the fluid controlled thereby therefore being prevented in the event of rupture of the diaphragm; this feature being claimed in my copending application Serial No. 544,511 mentioned in the first paragraph of this application.

It will be observed that the lever 27 is pivoted substantially in the plane of the diaphragm 22 so that movement of the diaphragm, as the lever is rocked, does not alter the volume of the chamber 32 above it nor the pressure of the air normally therein. This feature is claimed in my copending application Serial No. 536,699, filed May 22, 1944, now Patent No. 2,442,877, which is a division of application Serial No. 378,756, filed February 13, 1941, now Patent No. 2,354,704, granted August 1, 1944.

Mounted in an opening through an angled portion of the plate 31 is a solenoid operator generally indicated at 33 and comprising a plunger-tube 34 which is open to the chamber 32 so that the interior of the plunger-tube, which is closed at its top by a stop-plug 35, forms an extension of the chamber. Around the plunger-tube is an energizing coil 36 which is held in place by a spring 37 compressed against the top of the coil by a fitting 38 secured by a screw 39 to the stop-plug 35. The plunger 40 of the solenoid operator is connected by a link 41 to the right-hand extremity of the outside portion 28 of lever 27, so that when the operator is energized the resultant upward attraction of the plunger, into engagement with the stop-plug 35, effects opening of the closure 16 against the force of the bias spring 20.

Due to the tilted arrangement of the solenoid operator, when the plunger 40 is in attracted position its lower end is held in tight engagement with the side wall of the plunger-tube 34 by the force of spring 20 acting through the lever 27, so that vibration of the plunger when the operator is energized by alternating current is minimized; the upper end of the plunger being centered in the tube by a stop-button 42 cooperating with a recess (not shown) in the center of the top surface of the plunger; this feature being claimed in Patent No. 2,358,999 mentioned in the first paragraph of this application.

A roller 43 is pivotally mounted at its ends in openings in a vertical portion of the lever-portion 28 and in a bracket 44 secured to the lever. Cooperable with this roller is a cam 45 carried by a rod 46 which is supported in a bushing 47 threaded in a thickened portion of the side wall of the member 23 and is provided at its outer end with a handle 48; the outer end of the bushing being formed to provide shoulders which limit movement of the handle to an arc of 90° (in clockwise direction as viewed from the left of Fig. 1) from the position shown. To prevent leakage around the rod 46, a plurality of grooves 49 is provided therein, the grooves being packed with a suitable sealing lubricant.

The cam 45 is slotted to fit the flat sides of the inner end-portion 50 of the rod 46 and abuts another cam 51 which in turn abuts a shoulder formed by an enlarged portion 52 of the rod; the cam 51 having an opening conforming closely to the shape of the flattened portion 50 of the rod. The cams 45 and 51 are held in place by a leaf-spring 53 apertured to fit on the rod-portion 50 and bearing against a screw 54 threaded in a transverse opening through that portion. As is better seen in Fig. 2, the screw 54 is grooved to cooperate with a bent-up portion 55 of the cam 45, which portion is slotted to receive the neck of the screw and pinched around it. By manipulation of screw 54 the projection of cam 45 from the rod can be adjusted. The rod 46 is biased to its rotary position shown in the drawing by a torsion spring 56 connected at its ends to the cam 51 and to the bushing 47; the spring also being arranged to urge the rod in outward direction so that the outer shoulder of the enlarged rod-portion 52 bears against the adjacent surface of the bushing for sealing purposes.

The cam 51 is of insulating material and cooperates with a switch mounted directly above it. This switch comprises a base 57, of insulating material, which is secured to the plate 31 so as to sealingly cover an opening therethrough. As is seen in Fig. 2, the base 57 supports three terminal posts 58, 59 and 60. Clamped to the underside of the base by the post 60 is a resilient switch-blade 61 which carries a contact element 62. Cooperable with the element 62 is another contact element 63 provided at the bottom of post 58. The center post 59 forms no part of the switch and serves merely as means for anchoring connecting leads or wires. Clamped to the underside of the base by the outer terminal posts is a strip 64 of fibrous material which serves to insulate the exposed bottom end of the center post 59.

Covering the solenoid operator 33 is a housing 65 which fits freely around the sides of the member 23 and is held in place by a pair of screws 66 threaded at their lower ends in a bracket 67 secured to the switch base 57. In the side wall of this housing is a fitting 68 for introducing the electric service and control wires.

Referring now to the diagram of Fig. 3, the numeral 69 indicates a control device of the automatic switching type, such as a thermostat, which is connected by wires 70 to the terminal posts 58 and 60. The coil 36 of the solenoid operator is connected to the posts 59 and 60; and the electric service lines, indicated at 71, are connected to posts 58 and 59.

Normally, the operation of the valve is controlled electrically in response to the demand of the control device 69 which, when in circuit-closing condition, connects the solenoid coil 36 to the service lines 71, so that due to the resultant upward attraction of the plunger the lever 27 is rocked counterclockwise to effect opening of the closure 16; the lever rocking in the opposite direction under the force of the bias spring 29 when the solenoid is deenergized upon opening of the control device.

To open the valve manually in the event of failure of the electric service, the rod 46 is rotated by means of its handle, in counterclockwise direction as viewed in Fig. 2, so that the cam 45 is brought into engagement with the roller 43 and by continued rotation effects rocking of the lever 27 to open the closure; the roller resting in a notch 72 in the tip of the cam when the handle is in its fully-moved position. When the handle is released the parts remain in their moved positions, the roller being latched in the notched portion of the cam under the force of the bias spring 29. With the parts in their latched positions, the closure 16 is substantially fully-open and the plunger 40 in partially-attracted position, indicated by the broken lines 73, out of engagement with the stop-plug 35.

In the aforementioned operative movement of the cam-rod 46, the cam 51 engages the switch-blade 61 and flexes it upwardly so that the contacts 62—63 interengage. Since the switch constituted by blade 61 and contacts 62—63 is bridged across the outer terminal-posts 58 and 60, it is in parallel with the control device 69; the solenoid coil 36 therefore being connected by this switch to the service lines 71, so that upon restoration of electric service the solenoid operator is energized an the plunger 40 moves, from its partially-attracted position shown by the broken lines 73, to its fully-attracted position in engagement with the stop-plug 35. This upward movement of the plunger effects rocking of lever 27 sufficient to effect release of the roller from the notched portion of the cam 45, so that the cam-rod returns to normal position, as shown in the drawing, under the force of the torsion spring 56, and automatic electric operation of the valve is resumed.

If, upon restoration of the electric service, the control device 69 is in circuit-closing condition, the plunger will be retained in fully-attracted position and the valve will remain open; on the other hand, if the control device is then in open condition the operator will be deenergized by the opening of contacts 62—63 upon return of the cam-rod to its normal position, and the valve will close. By arranging the manually-operated switch within the chamber 32, the valve-opening, switching, and latching operations are accomplished by means of a unitary cam means. If it is desired to close the valve before restoration of electric service, this can be done by forceful rerotation of the cam-rod; the notch 72 being made relatively shallow to permit such operation.

The specific embodiment of my invention herein shown and described is susceptible of modification without departing from the spirit of the invention, and I intend therefore to be limited only by the scope of the appended claims.

I claim as my invention:

1. In a flow-controlling system of the type which comprises a valve body having a passage therethrough, a valve member in said body for controlling flow through said passage and biased to one controlling position, an electromagnetic operator mounted on said body and having a mechanical connection with said valve member, a source of electrical energy, first switching means for connecting said source to said operator, said operator being effective through said mechanical connection and when energized by current from said source to operate the valve member to another controlling position, manual means for operating the valve member to said other position in the event of failure of said source, and additional switching means actuated by said manual means when the same is in valve-member operating position for connecting said electromagnetic operator to said source independently of said first switching means: a lever arranged adjacent said additional switching means and constituting said mechanical connection, a manually rotatable rod mounted adjacent said lever and said additional switching means and constituting said manual means, unitary cam means on said rod operatively cooperable with both said lever and said additional switching means, means forming a latch for maintaining said rod in manually operated position during failure of said source, and a spring for returning said rod to its original position when said source is restored.

2. A flow-controlling system as defined in claim 1, and wherein said rod is disposed between said lever and said additional switching means, and said cam means is provided with a pair of radially-opposite cam surfaces cooperable respectively with the lever and with the additional switching means.

WILLIAM A. RAY.

REFERENCES CITED

The following references are of record in the file of this patent:

UNITED STATES PATENTS

| Number | Name | Date |
|---|---|---|
| 2,051,938 | Carlson | Aug. 25, 1936 |
| 2,155,358 | Cyr | Apr. 18, 1939 |
| 2,245,834 | Sparrow | June 17, 1941 |
| 2,269,016 | Gille | Jan. 16, 1942 |
| 2,358,999 | Ray | Sept. 26, 1944 |
| 2,442,877 | Ray | June 8, 1948 |